(12) United States Patent
Conzen et al.

(10) Patent No.: US 9,322,492 B2
(45) Date of Patent: Apr. 26, 2016

(54) PIPELINE CLAMP FOR VIBRATION MEASUREMENT

(75) Inventors: Jens Conzen, Oak Park, IL (US);
Samad Erogbogbo, Niles, IL (US);
Karim Dhanji, Skokie, IL (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 77 days.

(21) Appl. No.: 13/592,451

(22) Filed: Aug. 23, 2012

(65) Prior Publication Data

US 2014/0054429 A1    Feb. 27, 2014

(51) Int. Cl.
| | | |
|---|---|---|
| *F16L 3/08* | (2006.01) | |
| *F16L 3/10* | (2006.01) | |
| *A47B 96/00* | (2006.01) | |
| *A47K 1/00* | (2006.01) | |
| *A47K 5/00* | (2006.01) | |
| *G01H 1/00* | (2006.01) | |

(52) U.S. Cl.
CPC ............... *F16L 3/1091* (2013.01); *F16L 3/08* (2013.01); *G01H 1/00* (2013.01)

(58) Field of Classification Search
CPC ........ F16M 13/02; F16M 3/08; F01N 13/008; G01D 11/30; F16L 41/008; F16L 41/12; F16L 3/1091; G01K 13/02; G01K 1/08
USPC ............... 248/61, 63, 65, 74.1, 74.4, 58, 562, 248/636; 73/649
See application file for complete search history.

(56) References Cited

U.S. PATENT DOCUMENTS

| | | | | |
|---|---|---|---|---|
| 1,080,130 A | * | 12/1913 | Walsh ............... | H02G 7/10 248/61 |
| 1,819,768 A | * | 8/1931 | Coffing .............. | E04H 12/32 116/173 |
| 3,273,837 A | * | 9/1966 | Willer ............... | F16L 3/11 248/317 |
| 3,572,778 A | * | 3/1971 | Cassel .............. | F01M 11/00 285/382 |
| 3,905,623 A | * | 9/1975 | Cassel .............. | E02B 11/005 285/382 |
| 4,159,859 A | * | 7/1979 | Shemtov ........... | H01R 4/64 439/100 |
| 4,165,109 A | * | 8/1979 | Foti ................. | F01N 13/1805 285/148.26 |
| 4,312,526 A | * | 1/1982 | Cassel .............. | F16L 21/065 285/419 |
| 4,364,588 A | * | 12/1982 | Thompson ......... | F16L 21/06 138/99 |
| 4,557,447 A | * | 12/1985 | Combe ............. | F16L 3/127 248/62 |
| 4,674,720 A | * | 6/1987 | Fetsch ............. | F16L 3/12 24/20 EE |

(Continued)

FOREIGN PATENT DOCUMENTS

| | | | | |
|---|---|---|---|---|
| EP | 0235617 | A1 * | 9/1987 | ............ F16L 3/1211 |
| EP | 235617 | A1 * | 9/1987 | |

*Primary Examiner* — Jonathan Liu
*Assistant Examiner* — Muhammad Ijaz
(74) *Attorney, Agent, or Firm* — Richard J. Coldren; Westinghouse Electric Company LLC

(57) ABSTRACT

A pipeline clamp including a clamp assembly adapted to attach to an outer surface of a pipeline and a protruding member having a first end portion attached to a surface of the clamp assembly and a second end portion extended away from the clamp assembly. The second end portion is configured to accommodate a sensor and the pipeline clamp has a natural frequency equal to or greater than a maximum expected vibration frequency of the pipeline.

18 Claims, 4 Drawing Sheets

(56) References Cited

U.S. PATENT DOCUMENTS

| | | | | |
|---|---|---|---|---|
| 4,767,087 A * | 8/1988 | Combu | F16L 3/11 | 248/324 |
| 4,840,068 A * | 6/1989 | Mayhew, Jr. | G10L 19/0046 | 73/706 |
| 5,126,641 A * | 6/1992 | Putman | F16F 15/03 | 318/127 |
| 6,131,859 A * | 10/2000 | Giuliano | F16L 3/1016 | 24/279 |
| 6,481,673 B1 * | 11/2002 | Roe | B60K 13/04 | 284/300 |
| 6,519,815 B2 * | 2/2003 | Cassel | F16L 21/065 | 24/279 |
| 6,996,976 B2 * | 2/2006 | Rumminger | F01N 13/008 | 204/421 |
| 7,325,776 B2 * | 2/2008 | Shibuya | F16L 3/1016 | 24/284 |
| 7,581,879 B2 * | 9/2009 | Miyahara et al. | 374/148 | |
| 8,047,476 B2 * | 11/2011 | Van Walraven | F16L 3/1016 | 248/58 |
| 2005/0175066 A1 * | 8/2005 | Nakabayashi | G01K 13/02 | 374/148 |
| 2006/0043245 A1 * | 3/2006 | Baker | A47F 5/04 | 248/218.4 |
| 2006/0102807 A1 * | 5/2006 | Chen | F16L 3/127 | 248/65 |
| 2011/0054822 A1 * | 3/2011 | Bauschke | G01K 1/08 | 702/99 |
| 2011/0138584 A1 * | 6/2011 | Wild | F16B 7/1418 | 24/457 |
| 2013/0025905 A1 * | 1/2013 | Garvin | H01R 4/643 | 174/68.3 |
| 2013/0283928 A1 * | 10/2013 | Wiklund | G01K 1/08 | 73/861.18 |
| 2015/0159777 A1 * | 6/2015 | White | A63H 23/10 | 248/74.1 |

* cited by examiner

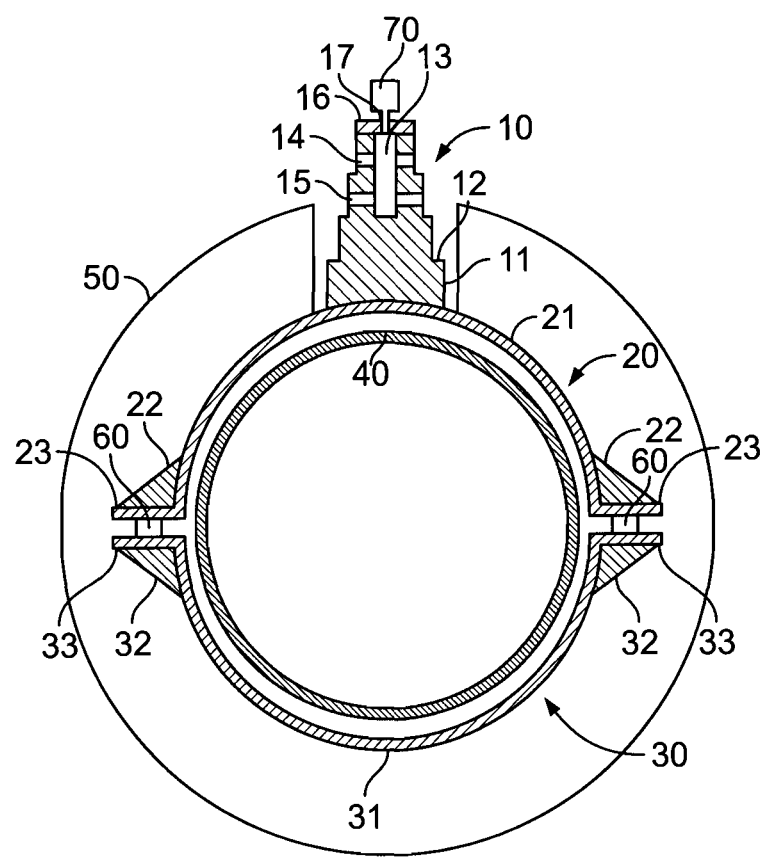

PIPELINE CLAMP FOR VIBRATION MEASUREMENT

BACKGROUND

1. Field

The present invention relates generally to pipelines and more particularly to a pipeline clamp adapted to accommodate a vibration sensor.

2. Related Art

In power plants, it is important to monitor pipeline vibration at all times. Excessive pipeline vibrations can lead to failure of the structure, which can result in a severe accident. To accurately measure the vibration of a pipeline, it is preferable to install vibration sensors, such as accelerometers, directly on the pipeline. However, installing vibration sensors directly on some pipelines can damage the sensors. For example, a pipeline which carries hot and/or radioactive material, such as a steam pipeline in a power plant, can cause damage to vibration sensors installed directly on the pipeline.

To prevent damage to the vibration sensors, the vibration sensors have been installed on pipe supports or pipe attachments. However, previous placements of the vibration sensors have resulted in inaccurate vibration data. In some cases, the vibration sensors would provide inaccurate vibration data that was so high as to cause an automatic shutdown of the power plant or to cause the power plant to operate at reduced power.

It is an object of this invention to overcome these difficulties.

SUMMARY

These and other objects are achieved by a pipeline clamp including a clamp assembly adapted to attach to an outer surface of a pipeline and a protruding member having a first end portion attached to a surface of the clamp assembly and a second end portion extended away from the clamp assembly. The second end portion is configured to accommodate a sensor and the pipeline clamp has a natural frequency equal to or greater than a maximum expected vibration frequency of the pipeline.

The maximum expected vibration frequency of the pipeline may be about 1 kHz. The cross-sectional area of the protruding member may decrease between the first end portion and the second end portion. The cross-sectional area of the protruding member may decrease in one or more steps between the first end portion and the second end portion. The protruding member may include a hollow portion. The hollow portion may include a first hollow portion which extends from the second end portion towards the first end portion. The hollow portion may include a second hollow portion substantially perpendicular to the first hollow portion. The clamp assembly may include a first clamp member adapted to conform to a first portion of an outer circumference of the pipeline and a second clamp member adapted to conform to a second portion of the outer circumference of the pipeline. The first clamp member may be adapted to attach to the second clamp member so as to attach the clamp assembly to the pipeline. The protruding member may be attached to one of the first clamp member and the second clamp member. The first clamp member may include a first flange and the second clamp member may include a second flange corresponding to the first flange. The first clamp member and the second clamp member may be attached by fastening the first flange and the second flange to each other with one or more fasteners. The first clamp member may include a first gusset attached to the first flange and the second clamp member may include a second gusset attached to the second flange.

Features and utilities of the present inventive concept may also be realized by a pipeline testing device including a sensor and a pipeline clamp. The pipeline clamp includes a clamp assembly adapted to attach to an outer surface of a pipeline and a protruding member having a first end portion attached to a surface of the clamp assembly and a second end portion extended away from the clamp assembly. The sensor is disposed on the second end portion of the protruding member. The pipeline clamp has a natural frequency equal to or greater than a maximum expected vibration frequency of the pipeline.

BRIEF DESCRIPTION OF THE DRAWINGS

A further understanding of the invention can be gained from the following description of the preferred embodiments when read in conjunction with the accompanying drawings in which:

FIG. 4 is a cross-sectional view of a pipeline clamp attached to a pipeline according to one of several potential embodiments of the invention.

DESCRIPTION OF THE PREFERRED EMBODIMENT

When a vibration sensor is used to measure the vibration of a pipeline, any pipeline support or pipeline attachment that the vibration sensor is mounted to will affect the accuracy of the vibration sensor. Previous placements of vibration sensors have resulted in inaccurate vibration data, and in particular, would result in amplified vibration data. The inventors have discovered that resonance of the pipeline support or pipeline attachment to which the vibration sensor is attached causes amplified vibration data at the natural frequency of the pipeline support or pipeline attachment.

The present general inventive concept addresses the aforementioned problem by providing a pipeline clamp which has a natural frequency which is greater than a maximum expected pipeline vibration frequency, and thus cannot establish a resonance based on expected pipeline vibration frequencies. The expected pipeline vibration frequencies are frequencies at which the pipeline vibrates during normal operations.

As such, a vibration sensor installed on the pipeline clamp allows more accurate vibration data than a vibration sensor installed on a support or attachment which resonates at an expected pipeline vibration frequency. An exemplary embodiment of a pipeline clamp according to the present inventive concept is described hereafter.

Figure 1:
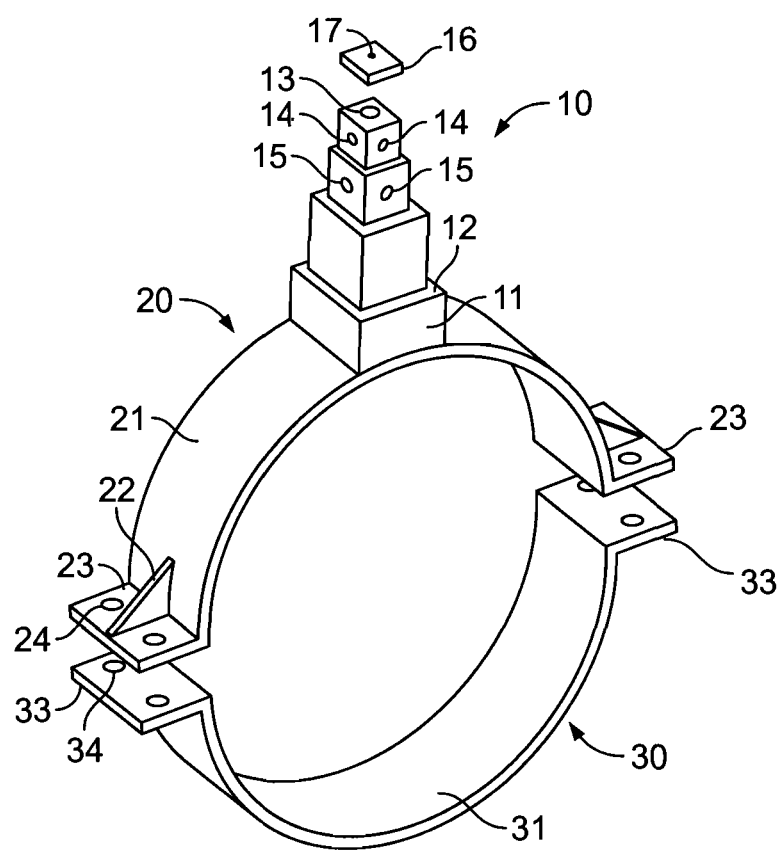
FIG. 1 is an isometric view of a pipeline clamp according to one of several potential embodiments of the invention.
Figure 2:
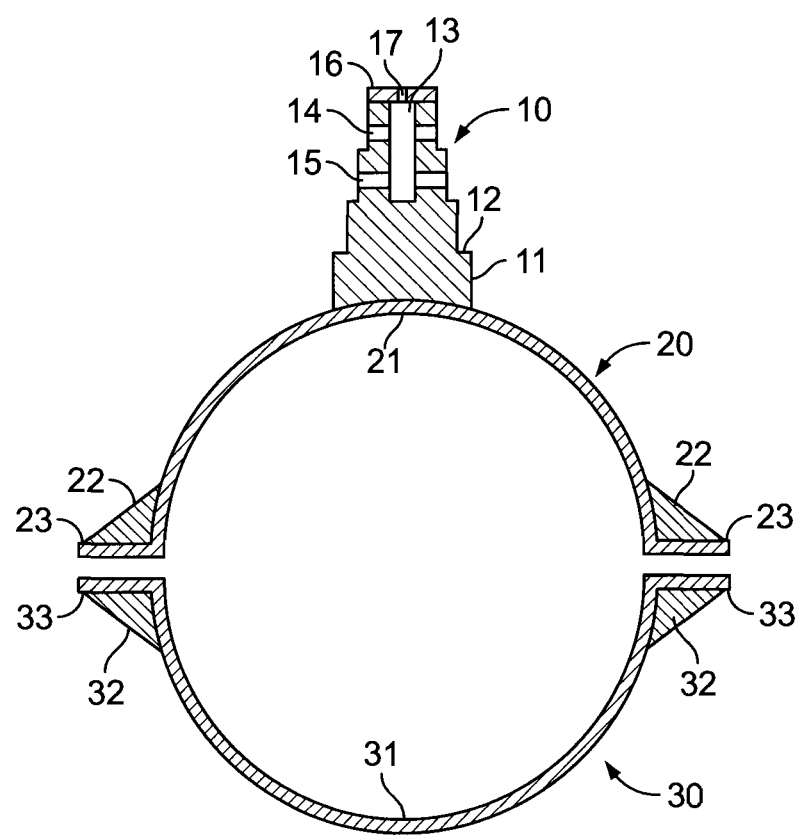
FIG. 2 is a cross-sectional view of a pipeline clamp according to one of several potential embodiments of the invention.
Figure 3:
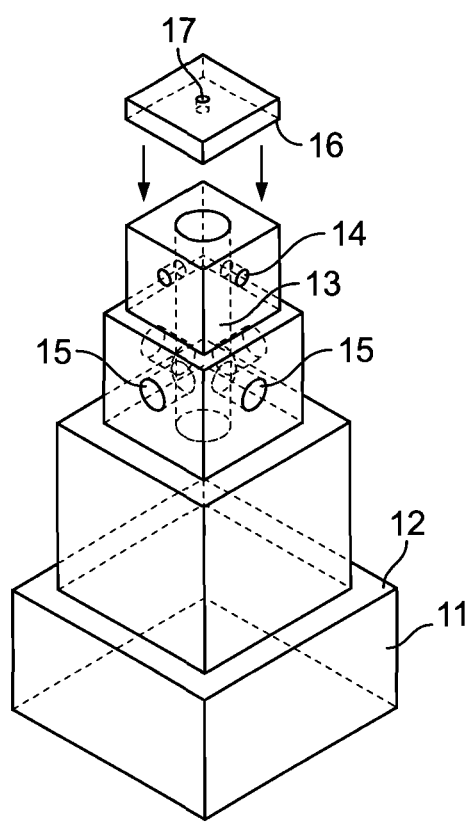
FIG. 3 is an isometric view of a protruding member according to one of several potential embodiments of the invention.

FIG. 1 is an isometric view of a pipeline clamp according to an exemplary embodiment of the present inventive concept. The pipeline clamp includes a protruding member 10, an upper clamp collar 20, and a lower clamp collar 30. FIG. 2 is a cross-sectional view of the pipeline clamp illustrated in FIG. 1. FIG. 3 is an isometric view of a protruding member 10 which is not attached to the upper clamp collar 20.

In the embodiment described herein, the pipeline clamp has a natural frequency which is equal to or greater than about 1 kHz. 1 kHz is greater than expected pipeline vibration frequencies of a main steam pipeline in a nuclear power plant, and thus the pipeline clamp would not establish resonance while being used in measuring vibrations of such a pipeline. However, it is appreciated that the pipeline clamp may be used or adapted for use in measuring vibrations of a variety of pipelines while remaining within the scope of the present inventive concept.

The upper clamp collar 20 and lower clamp collar 30 together form a clamp assembly. The clamp assembly attaches to a pipeline so as to secure the pipeline clamp to the pipeline. The upper clamp collar 20 and lower clamp collar 30 of the pipeline clamp each have an arc portion 21 and 31 which is shaped to conform to an outer circumference of a pipeline. To attach the pipeline clamp to the pipeline, the upper clamp collar 20 and lower clamp collar 30 are placed around the pipeline and then attached to each other.

The upper clamp collar 20 and lower clamp collar 30 also have flanges 23 and 33 formed at each end of the arc portions 21 and 31. The flanges 23 of the upper clamp collar 20 corresponding to the flanges 33 of the lower clamp collar 30. The flanges 23 and 33 each have openings 24 and 34 formed therein to receive fasteners such as, for example and without limitation, bolts, which are used to fasten the upper clamp collar 20 to the lower clamp collar 30. In one example embodiment, four hex head M10 bolts (about 60 mm long and grade 8.8 or higher) along with two appropriately sized washers for each bolt are used to fasten the upper clamp collar 20 and the lower clamp collar 30 together.

The upper clamp collar 20 and the lower clamp collar 30 each include gussets 22 and 32 formed between the flanges 23 and 33 and the arc portions 21 and 31 of the upper and lower clamps 20 and 30.

In the embodiment shown in FIG. 1, the protruding member 10 is attached to the upper clamp collar 20. However, it is contemplated that the protruding member 10 may also be attached to the lower clamp collar 30 while remaining within the scope of the invention. The protruding member may be attached to the upper clamp collar 20 by any suitable means which rigidly attaches the protruding member 10 and the upper clamp collar 20 together, such as, for example and without limitation, by welding the protruding member 10 to the upper clamp collar 20.

A first end of the protruding member 10 is attached to the upper clamp 20 and a second end of the protruding member 10 is disposed away from the upper clamp 20. A sensor can be attached to the second end of the protruding member 10. In one example embodiment, the second end of the protruding member 10 includes a threaded opening which is used to attach the sensor. In another example embodiment, the second end of the protruding member 10 includes a cap 16 which has a threaded opening 17 which is used to attach the sensor. However, it is contemplated that the sensor can be attached to the second end of the protruding member 10 by various suitable means while remaining within the scope of the invention.

A cross-sectional area of the protruding member 10 decreases in a direction away from the first end of the protruding member 10 towards the second end of the protruding member 10. In the example embodiment illustrated in FIG. 1, the cross-sectional area of the protruding member 10 decreases in a series of steps. As illustrated in FIG. 1, each step has surfaces 11 which are parallel to the direction from the first end to the second end of the protruding member 10, and surfaces 12 which are perpendicular to the direction from the first end to the second end of the protruding member 10.

By decreasing the cross-sectional area of the protruding member 10 in a direction away from the first end of the protruding member 10 towards the second end of the protruding member 10, a moment of inertia of the protruding member 10 is increased compared with a beam having a constant cross-sectional area. The increased moment of inertia in turn increases the stiffness of the protruding member 10, thus increasing the natural frequency of the pipeline clamp.

Additionally, by decreasing the cross-sectional area of the protruding member 10 in a direction away from the first end of the protruding member 10 towards the second end of the protruding member 10, a center of gravity of the protruding member 10 is moved closer to the pipeline compared to a beam having a constant cross-sectional area. Thus, the amount of torque the protruding member 10 applies to the upper clamp 20 is reduced. If the protruding member 10 were to apply too much torque to the upper clamp 20, the pipeline clamp could slip about the pipeline rather than remain firmly attached to the pipeline.

The step design of the protruding member 10 also allows for high repeatability in the manufacturing of the protruding member 10. That is, it is easy to manufacture a series of protruding members 10 that are very similar to each other. In particular, manufacturing a protruding member 10 with a series of steps having a square or rectangular cross-section is easily repeated. Small variations in the protruding member 10 can have a large effect on the natural frequency of the pipeline clamp, and thus it is beneficial to use a step design which is easily repeatable.

The protruding member 10 also includes a hollow portion 13, 14, and 15. In the embodiment of FIG. 1, the hollow portion 13, 14, and 15 includes a first hollow portion 13 and second hollow portions 14 and 15. The first hollow portion 13 is formed in the protruding member 10 a portion of the way from the second end to the first end. The second hollow portions 14 and 15 are formed in directions which are perpendicular with the first hollow portion 13. The hollow portions 13, 14, and 15 are open to an exterior of the protruding member 10.

Heat can transfer from a pipeline into the protruding member 10. Also, many type of vibration sensors are temperature sensitive and a high temperature can affect the accuracy of measurements made by the sensors. The hollow portions 13, 14, and 15 promote circulation which puts a sensor mounted on the end of the protruding member 10 in a cooler environment than the remainder of the protruding member 10, thus reducing effects of pipeline heat on the sensor. Additionally, the hollow portions 13, 14, and 15 reduce the mass of the protruding member 10 which is most distant from the upper clamp 20, thus moving the center of gravity of the protruding member 10 closer to the upper clamp 20 and reducing the torque the protruding member 10 applies on the upper clamp 20.

FIG. 4 is a cross-sectional view of a pipeline clamp attached to a pipeline in accordance with principles of the present inventive concept. The pipeline clamp illustrated in FIG. 4 is similar to the pipeline clamp described above with relation to FIG. 1.

As illustrated in FIG. 4, the pipeline clamp is attached to pipeline 40. More specifically, upper clamp collar 20 is disposed around an upper portion of the pipeline 40 and lower clamp collar 30 is disposed around a lower portion of pipeline 40. Upper clamp collar 20 and lower clamp collar 30 are attached together by fasteners 60 through flanges 23 and 33. The fasteners 60 are suitably tightened so that upper clamp collar 20 and lower clamp collar 30 clamp to the pipeline 40 and hold the pipeline clamp firmly in place against the pipeline 40. The fasteners 60 may also be suitably tightened so that the upper clamp collar 20 and lower clamp collar 30 deform so as to conform to the shape of the pipeline 40.

The pipeline 40 is also surrounded by insulation 50. The pipeline clamp is disposed between the pipeline 40 and the insulation 50. The protruding member 10 protrudes through an opening in the insulation. As such, the protruding member can be accessed and a vibration sensor 70 can be installed on the protruding member 10 without removing the insulation 50 from the pipeline 40.

The vibration sensor 70 is installed on the protruding member by, for example, attaching the vibration sensor 70 to the second end of the protruding member 10. In the embodiment illustrated in FIG. 4, the vibration sensor 70 is attached to the protruding member through the threaded opening 17. However, it will be appreciated that any suitable means of attaching the vibration sensor 70 to the protruding member 10 may be used without departing from the scope of the invention. When the vibration sensor 70 is located at the second end of the protruding member 10, the heat and radiation that the vibration sensor 70 is exposed to is reduced as compared with a vibration sensor directly attached to the pipeline 40. The vibration sensor 70 may be, for example and without limitation, an accelerometer or tri-axial accelerometer.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A pipeline clamp comprising:
   a clamp assembly adapted to attach to an outer surface of a pipeline; and
   a unitary protruding member having a first end portion attached to a surface of the clamp assembly and a second end portion extended away from the clamp assembly, wherein the second end portion is configured to accommodate a vibration sensor, and wherein the protruding member includes:
      a plurality of steps, wherein one or more of the steps at the first end portion of the protruding member are solid with no hollow portion and one or more of the steps at the second end of the protruding member include a hollow portion,
      wherein the pipeline clamp has a natural frequency equal to or greater than a maximum expected vibration frequency of the pipeline.

2. The pipeline clamp of claim 1, wherein the maximum expected vibration frequency of the pipeline is about 1 kHz.

3. The pipeline clamp of claim 1, wherein a cross-sectional area of the protruding member decreases between the first end portion and the second end portion.

4. The pipe line clamp of claim 3, wherein reach steps of the protruding member has a smaller cross-sectional area than steps disposed closer to the first end portion of the protruding member.

5. The pipeline clamp of claim 1, wherein the hollow portion includes a first hollow portion which extends in a direction from the second end portion towards the first end portion.

6. The pipeline clamp of claim 5, wherein the hollow portion includes a second hollow portion substantially perpendicular to the first hollow portion.

7. The pipeline clamp of claim 1, wherein the clamp assembly comprises:
   a first clamp member adapted to conform to a first portion of an outer circumference of the pipeline; and
   a second clamp member adapted to conform to a second portion of the outer circumference of the pipeline,
   wherein the first clamp member is adapted to attach to the second clamp member so as to attach the clamp assembly to the pipeline, and the protruding member is attached to one of the first clamp member and the second clamp member.

8. The pipeline clamp of claim 7, wherein the first clamp member includes a first flange and the second clamp member includes a second flange corresponding to the first flange, wherein the first clamp member and the second clamp member are attached by fastening the first flange and the second flange to each other with one or more fasteners.

9. The pipeline clamp of claim 8, wherein the first clamp member includes a first gusset attached to the first flange and the second clamp member includes a second gusset attached to the second flange.

10. A pipeline testing device comprising:
    a vibration sensor; and
    a pipeline clamp comprising:
    a clamp assembly adapted to attach to an outer surface of a pipeline; and
    a unitary protruding member having a first end portion attached to a surface of the clamp assembly and a second end portion extended away from the clamp assembly, wherein the vibration sensor is disposed on the second end portion of the protruding member, and wherein the protruding member includes:
    a plurality of steps, wherein one or more of the steps at the first end portion of the protruding member are solid with no hollow portion, and one or more of the steps at the second end of the protruding member include a hollow portion, and
    wherein the pipeline clamp has a natural frequency equal to or greater than a maximum expected vibration frequency of the pipeline.

11. The pipeline testing device of claim 10, wherein the maximum expected vibration frequency of the pipeline is about 1 kHz.

12. The pipeline clamp of claim 10, wherein a cross-sectional area of the protruding member decreases between the first end portion and the second end portion.

13. The pipe line clamp of claim 12, wherein reach steps of the protruding member has a smaller cross-sectional area than steps disposed closer to the first end portion of the protruding member.

14. The pipeline clamp of claim 10, wherein the hollow portion includes a first hollow portion which extends in a direction from the second end portion towards the first end portion.

15. The pipeline clamp of claim 14, wherein the hollow portion includes a second hollow portion substantially perpendicular to the first hollow portion.

16. The pipeline clamp of claim 10, wherein the clamp assembly comprises:
    a first clamp member adapted to conform to a first portion of an outer circumference of the pipeline; and
    a second clamp member adapted to conform to a second portion of the outer circumference of the pipeline,
    wherein the first clamp member is adapted to attach to the second clamp member so as to attach the clamp assembly to the pipeline and the protruding member is attached to one of the first clamp member and the second clamp member.

17. The pipeline clamp of claim 16, wherein the first clamp member includes a first flange and the second clamp member includes a second flange corresponding to the first flange, wherein the first clamp member and the second clamp member are attached by fastening the first flange and the second flange to each other with one or more fasteners.

18. The pipeline clamp of claim 17, wherein the first clamp member includes a first gusset attached to the first flange and the second clamp member includes a second gusset attached to the second flange.

* * * * *